Patented Feb. 17, 1948

2,436,299

UNITED STATES PATENT OFFICE 2,436,299

STORAGE BATTERY PLATE PASTE EXPANDER

Alva L. Hindall, Muncie, Ind., assignor to General Motors Corporation, Detroit, Mich., a corporation of Delaware No Drawing. Application July 31, 1947, Serial No. 765,260

6 Claims. (Cl. 136—26)

This invention relates to the manufacture of storage batteries and is concerned with an expander for the negative plate paste.

This application is a continuation in part of my copending application, Serial No. 552,681, filed September 4, 1944.

It is an object of the present invention to provide an expander which will improve the performance of the battery as to cold discharge rate, cycling life and endurance on the overcharge test, and to facilitate the manufacture of the battery by reduction of the time required for formation.

These and other objects are accomplished by the provision of an expander which causes the sponge lead particles comprising the active material of the negative plate to be initially in a finely divided condition spaced by channels through which the electrolyte can diffuse, and to maintain the condition for a long period. The present expander provides for the accomplishment of these objects in the following manner. Substantially all of the sponge lead particles are initially promptly coated with organic material and are supplied with such coating as needed thereafter from a reservoir of coating ingredient provided by the expander. Coating prevents coalescence of the particles and leaves no exposed areas for deposition of free lead in the electrolyte. Crystal growth is prevented by preventing deposition upon the sponge lead particles of lead sulphate present during discharge. Lead sulphate crystals are attracted to crystals of the same form and structure, provided by an inert material such as colloidal barium sulphate evenly dispersed throughout the sponge lead. Therefore the change from lead sulphate to lead during the charge cycle does not produce crystal growth. Growth of sponge lead crystals is prevented also by the prevention of the "plating out" of free lead. The expander provides an element, such as sodium, which, I believe, unites with oxygen and lead to form an ionizable substance from which lead peroxide migrates to the positive plate. Thus plating of lead on the sponge lead crystals is avoided and shedding of the positive plate is repaired. The expander provides a substance such as sodium hydroxide, which, during formation of the plates, accelerates the conversion of lead sulphate on the pickled negative plate to sponge lead. Time of formation is substantially reduced. Due to the presence of this substance, there is a continuous supply of lead ions from the reservoir of slightly soluble lead sulphate provided by the pickled negative plate. Therefore gassing of the battery during formation is reduced and the rise of battery charging voltage is prevented until near the end of the formation period and thereafter, until near the end of any charge period. Since gassing is minimized, shedding of the positive plate is reduced and positive cycling ability is increased.

Further objects and advantages of the present invention will be apparent from the following description.

Formulas for the compound may vary considerably as follows:

| | Parts by weight |
|---|---|
| Lignin-bearing material | 15 to 40 |
| Carbon black | 4 to 15 |
| Alkaline earth metal hydroxide | 9 to 30 |
| Alkali metal hydroxide | 3 to 13 |
| Lignone (waste sulphite liquor) | 10 to 50 |
| Water, as required. | |

A preferred formula is as follows:

| | Per cent |
|---|---|
| Red oak sawdust | 20.3 |
| Carbon black | 10.2 |
| Barium hydroxide | 20.6 |
| Sodium hydroxide | 8.3 |
| Lignone (waste sulphite liquor) | 40.6 |
| Water, as required. | |

The preferred formula stated to the nearest part is as follows:

| | Parts |
|---|---|
| Red oak sawdust | 20 |
| Carbon black | 10 |
| Barium hydroxide | 21 |
| Sodium hydroxide | 8 |
| Lignone (waste sulphite liquor) | 41 |
| Water, as required. | |

The amount of water is that required to make the mix sufficiently fluid for stirring easily and may vary as required.

In place of red oak sawdust, other lignin-bearing materials can be used, such as birch, maple, pine and spruce sawdusts and also straw, corncobs, peat moss, and in fact any lignin-bearing material. Red oak sawdust has been found to give best results and is therefore preferred.

The present invention is not limited to the use of sodium hydroxide as the hydroxides of other alkali metals, such as potassium, lithium, caesium and rubidium, can be used in place of sodium hydroxide. Sodium hydroxide is preferred due to its abundance and cheapness. The oxides of the alkali metals can also be used instead of the hydroxides.

Instead of barium hydroxide, an equivalent amount of barium oxide can be used. The hydroxides and oxides of other members of the alkaline earth family, such as calcium and strontium, can be substituted if desired, since the cell units of the sulphates of the alkaline earth family are similar to the cell unit of lead sulphate. The cell units of lead sulphate and the sulphates of calcium, barium and strontium are all classified in the orthorhombic crystallographic system and have comparable dimensions in angstrom units. In fact the Angstrom dimensions of the strontium sulphate unit and of the lead sulphate unit are almost identical.

In compounding the material the sawdust and carbon black are added to the water as solids. The barium hydroxide and sodium hydroxide are added as solutions. The mixture is agitated while cooking for six hours at a temperature of 212° F. Then the lignone in solution is added and cooking is continued for two hours. The material is then dried and ground to a suitable fineness, preferably so that 95% will pass through a 200 mesh screen.

During the cooking process, the sodium and barium hydroxides act upon the sawdust to form soluble lignin salts of barium and sodium and also partially mercerize the cellulose. At the same time, the carbon black is activated by the removal of its oils through the saponifying action of the sodium hydroxide. The activated carbon black absorbs the added lignone and soluble lignin salts from the red oak sawdust in much greater quantities than is possible with ordinary carbon black or lamp black. The partial mercerization of the cellulose also increases the amount of lignone and soluble lignin salts absorbed by the sawdust. The added lignone and soluble lignin salts aid in causing precipitation of colloidal or essentially colloidal $BaSO_4$ in the negative plate during the processing of the battery.

During the grinding process, the activated carbon black with its large amount of absorbed lignone and lignin salts is spread around the cellulose fibers so that a homogeneous mixture of the expander ingredients is obtained which results in greater improvement of the battery than is possible to obtain by the addition of individual expanding ingredients at one time to the paste mix.

Satisfactory results are obtained by mixing the expander in the plate paste in quantities of from .2% to 2% by weight, with 1.46% being the preferred addition.

In the paste mixing advantage is taken of the spreading power of the carbon black and its absorbed constituents to cause the expanding ingredients to be spread around and in between the particles of lead oxide much more uniformly, than heretofore possible with known expanders. Furthermore, since the expanding ingredients are all water soluble, except the sawdust and carbon black, the paste mixing water will spread the expanders still further, taking them into the small intercellular spaces between the particles of lead oxide which, otherwise, never could receive any expander. Mixing results in the formation of certain chemical combinations of lead, lignin, sodium and barium for useful purposes, as will be shown later.

The pasted negative plates are cured or baked in a controlled atmosphere. After curing, if desired they may be immersed in a bath of sulphuric acid, specific gravity of 1.330, for the purpose of "pickling" or converting lead oxide to lead sulphate. Thus each negative plate is provided initially with a reservoir of lead sulphate and other ingredients for useful purposes. The pickling acid effects the precipitation of soluble ingredients of the expander except the sodium component which remains soluble and diffuses from the plate into the electrolyte, thereby leaving a multitude of small channels through which the electrolyte can readily diffuse into the active material.

One of the ingredients which is precipitated during pickling is a lignin-like substance which, before pickling, was in the form of a soluble lead-lignin salt. The precipitated lignin-like substance acts as an initial or primary expander by coating the particles of sponge lead of the negative plate in order to prevent growth of the lead particles. There is also present in the unhydrolized residue of the red oak sawdust an initially insoluble lignin compound from which a lignin-like substance is not precipitated during pickling. During the use of the battery however this initially insoluble form of lignin (also uniformly dispersed by the carbon black) gradually goes into solution and reacts to provide more lignin-like precipitate for coating the lead particles. Thus the initially insoluble lignin compound provides a reservoir or supply for the lignin-like precipitate, further coats the sponge lead particles and aids in maintaining the sponge lead particles coated at all times.

The precipitation of colloidal or essentially colloidal $BaSO_4$ in the negative plate during pickling is of great utility. $BaSO_4$ and $PbSO_4$ belong to the orthorhombic crystallographic system and have practically the same size unit cell; also the arrangement of the atoms within these unit cells is known to be identical. Therefore, the solid barium sulphate will act as a nucleus for the growth of crystals of lead sulphate. Furthermore the lead sulphate present during discharge will crystalize on the barium sulphate and have a much less tendency to coat the particles of sponge lead. The metallic lead surfaces will therefore be left free for additional discharge and the discharge capacity of the battery will be increased. Since the barium sulphate which is formed in the negative plate is colloidal or essentially colloidal, the active surface of the barium sulphate is greatly increased over that which is possible when commercial barium sulphate is used; hence the performance is improved.

The pickled negative plates are assembled with pasted and cured positive plates into battery cells and both sets of plates are formed simultaneously in sulphuric acid, specific gravity, (1.440) and with one ampere of current per positive plate for 42 hours. After formation the battery is ready for service.

Inspection of negative plates made with the present expander with the aid of the X-ray spectroscope shows that the particles of metallic lead in the active material are considerably smaller than those of negative plates made heretofore. Obviously, the number of small particles is greatly increased by the use of the present expander. These small particles do not increase in size and they do not coalesce during the life of the battery because of the lignin-like substance that is present to coat them, first as an initial precipitate from a soluble lignin compound during pickling and, later, as precipitate from a lignin compound which dissolves slowly during use of the battery. These lead particles remain free to discharge by reason of the fact that the colloidal barium sulphate has an affinity for the lead sulphate formed during discharge due to the similarity of crystalline form and cell structure. The present expander material has the following characteristics which bring about these results: (1) it is partly soluble in order to function quickly; (2) it has good spreading ability in order quickly to coat all particles of lead oxide in the paste mix; (3) it provides a reservoir for the future supply of the expanding constituents throughout the life of the battery.

The feature which effects increase in cold discharge rate also effects great improvement in negative cycling ability. The use of the present expander has resulted in a vast increase of cycling life. Negative plate failure on the cycling test is usually due to: (1) coalescence of the metallic sponge lead; (2) crystal growth of the sponge lead; (3) sulphation of the negative material, causing hard and dead negatives; (4) deposition of metallic impurities on the surface of the negative plates which cause sulphation and self discharge.

Coalescence of the metallic sponge lead is caused by lack of the proper distribution of the expander between the particles of the sponge lead which permits many points of contact between the individual particles. When these particles make contact, there is a natural tendency to form a conglomerate mass of dense hard lead. The present expander prevents this by providing immediately and constantly, during the life of the battery, a protective coating for the particles of sponge lead. The present expander displays colloidal or semi-colloidal properties since it can not be separated out by ordinary filtering. These colloidal particles, absorbed in and distributed by the finely divided, activated carbon black and partially mercerized cellulose effects the covering of practically all of the surface of the lead particles with the expander, thereby preventing any coalescence of the lead particles during cycling by eliminating possible points of contact therebetween.

Positive cycling ability is improved because the migration of the $PbO_2$ to the positive plate repairs shedding, and because of the reduced gassing period.

"Plating-out" of free lead is eliminated. No apparent crystal growth of the sponge lead is noted. Improved negative cycling ability and improved endurance on overcharge test are also apparent.

It has been found that negative plates made with the expander of the present invention are capable of being rejuvenated to such an extent that they will more than outlast three sets of positive plates.

While the embodiments of the present invention as herein disclosed, constitute preferred forms, it is to be understood that other forms might be adopted, all coming within the scope of the claims which follow.

What is claimed is as follows:

1. A negative plate paste for use in a lead storage battery including an expander for improving the cold discharge rate, cycling life and endurance of the battery, said expander comprising in combination; red oak sawdust 20 parts, carbon black 10 parts, sodium hydroxide 8 parts, barium hydroxide 21 parts, waste sulfite liquor 41 parts, said ingredients being reacted, dried and comminuted and mixed with the negative plate paste in quantities of from .2% to 2% by weight of the plate paste.

2. A negative plate paste for use in a lead storage battery including an expander for improving the cold discharge rate, cycling life and endurance of the battery, said expander comprising in combination; red oak sawdust 15 to 40 parts, carbon black 4 to 15 parts, alkaline earth metal hydroxide 9 to 30 parts, alkali metal hydroxide 3 to 13 parts, waste sulfite liquor 10 to 50 parts, said ingredients being reacted, dried and ground and added to the negative plate paste in quantities of from .2% to 2% by weight of the plate paste.

3. A negative plate paste for use in a lead storage battery including an expander for improving the cold discharge rate, cycling life and endurance of the battery, said expander comprising in combination; a comminuted lignin bearing material selected from the group consisting of straw, peat moss, corncobs, red oak, birch, maple, pine and spruce in quantities of from 15 to 40 parts, carbon black in quantities of 4 to 15 parts, alkaline earth metal hydroxide of 9 to 30 parts, alkali metal hydroxide of 3 to 13 parts, and waste sulfite liquor of 10 to 50 parts, said ingredients being mixed together in a water solution and cooked for an appreciable period at about the boiling point of water, after which the solid matter is filtered, dried and ground and then added to the negative plate paste of a storage battery in quantities of from .2% to 2% by weight of the plate paste.

4. A negative plate paste for use in a lead storage battery including an expander for improving the cold discharge rate, cycling life and endurance of the battery, said expander comprising in combination; the dried comminuted reaction product of the following ingredients, a comminuted lignin bearing material selected from the group consisting of straw, peat moss, corncobs, red oak, birch, maple, pine and spruce 20.3%, carbon black 10.2%, an alkaline earth metal hydroxide taken from the group consisting of barium, calcium and strontium hydroxides 20.6%, an alkali metal hydroxide taken from the group consisting of sodium, potassium, lithium, caesium and rubidium hydroxides 8.3% and waste sulfite liquor 40.6%, said dried and ground expander material being added to the plate paste in quantities of from .2% to 2% by weight of the plate paste.

5. A negative plate paste for use in a lead storage battery including an expander for improving the cold discharge rate, cycling life and endurance of the battery, said expander comprising in combination; the dried comminuted reaction product of the following ingredients, a comminuted lignin bearing material selected from the group consisting of straw, peat moss, corncobs, red oak, birch, maple, pine and spruce 20.3%, carbon black 10.2%, an alkaline earth oxide taken from the group consisting of barium, calcium, and strontium oxides 20.6%, an alkali metal oxide taken from the group consisting of sodium, potassium, lithium, caesium and rubidium oxides 8.3% and waste sulfite liquor 40.6%, said dried and ground expander material being added to the plate paste in quantities of from .2% to 2% by weight of the plate paste.

6. A negative plate paste for use in a lead storage battery including an expander for improving the cold discharge rate, cycling life and endurance of the battery, said expander comprising in combination; the dried comminuted reaction product of the following ingredients, a comminuted lignin bearing material selected from the group consisting of straw, peat moss, corncobs, red oak, birch, maple, pine and spruce 20.3%, carbon black 10.2%, an alkaline earth oxide taken from the group consisting of barium, calcium and strontium oxides 20.6%, an alkali metal oxide taken from the group consisting of sodium, potassium, lithium, caesium and rubidium oxides 8.3% and waste sulfite liquor 40.6%, said dried and ground expander material being added to the plate paste in quantities of 1.46% by weight of the plate paste.

ALVA L. HINDALL.

REFERENCES CITED

The following references are of record in the file of this patent:

UNITED STATES PATENTS

| Number | Name | Date |
| --- | --- | --- |
| 1,379,900 | Chamberlain | May 31, 1921 |
| 2,030,717 | Reinhardt | Feb. 11, 1936 |
| 2,217,814 | Pritchard et al. | Oct. 15, 1940 |
| 2,371,137 | Orsino | Mar. 13, 1945 |

OTHER REFERENCES

Willihnganz, E., Nat'l Lead Co. Lab. Publ. No. 63 (1942), pages 7 and 11–15.

Willihnganz, E., Trans. Electrochemical Socy., vol. 79 (1941), page 243.